United States Patent [19]

Tachibana et al.

[11] Patent Number: 5,464,341
[45] Date of Patent: Nov. 7, 1995

[54] APPARATUS FOR FORMING SHEET MATERIALS

[75] Inventors: Hiroshi Tachibana, Tokyo; Harumi Kizuki, Kawaguchi, both of Japan

[73] Assignee: Kabushiki Kaisha Tachibana Seisakusho, Tokyo, Japan

[21] Appl. No.: 171,743

[22] Filed: Dec. 22, 1993

[30] Foreign Application Priority Data

Jan. 14, 1993 [JP] Japan ................... 5-022065

[51] Int. Cl.⁶ ..................... B29C 53/04; B22B 31/20
[52] U.S. Cl. .................. 425/388; 156/382; 156/443; 156/499; 425/389; 425/DIG. 48
[58] Field of Search ................. 425/384, 388, 425/389, 405.1, DIG. 48; 156/382, 443, 499

[56] References Cited

U.S. PATENT DOCUMENTS

| | | | |
|---|---|---|---|
| 2,151,880 | 3/1939 | Wiederkehr | 425/389 |
| 2,385,544 | 9/1945 | Salisbury | 425/389 |
| 2,390,684 | 12/1945 | Bendix | 425/389 |
| 2,401,299 | 6/1946 | Glavin | 425/389 |
| 3,466,706 | 9/1969 | Asano | 425/DIG. 48 |
| 3,914,103 | 10/1975 | Dean et al. | 425/DIG. 48 |
| 4,475,976 | 10/1984 | Mittelstadt et al. | 425/389 |
| 4,608,220 | 8/1986 | Caldwell et al. | 425/389 |

FOREIGN PATENT DOCUMENTS

3-286802A 4/1990 Japan.

*Primary Examiner*—James P. Mackey
*Attorney, Agent, or Firm*—Ronald R. Snider

[57] ABSTRACT

The mold is secured on the bed portion, and the frame is moved up and down by the jack devices so that the rubber sheet is moved down to the mold and moved up from the mold in a reciprocating motion. While setting the work W, the rubber sheet is stretched by the sheet stretching devices for absorbing the deflection of the rubber sheet, thereby the possibility of the dislocation of the work W on the mold due to the contact with the rubber sheet is reduced, and the insertion of the work between the rubber sheet and the mold becomes easy. Both edge portions of the rubber sheet extending beyond the edge of the mold are clipped by the convex portion formed on the bed portion and the concave portion formed on the frame, thereby the wrinkling of the rubber sheet hardly occurs.

14 Claims, 6 Drawing Sheets

APPARATUS FOR FORMING SHEET MATERIALS

CROSS-REFERENCE TO RELATED APPLICATION

This application claims priority benefits under 35 U.S.C., 119 of Japanese application Serial No. 5 - 22065, filed Jan. 14, 1993 the entire disclosure of which is incorporated herein by reference.

FIELD OF INVENTION

This invention relates to an apparatus for bending sheet materials, such as laminated boards formed into semicircular shape.

BACKGROUND OF THE INVENTION

Plywood has been processed into a hollow pipe through a process of bending two pieces of plywood into a semicircular shape and subsequent combining of them. Hollow pipes prepared by such method have been used for, for example, obtaining concrete columns by molding concrete in said hollow pipes.

Figure 6:
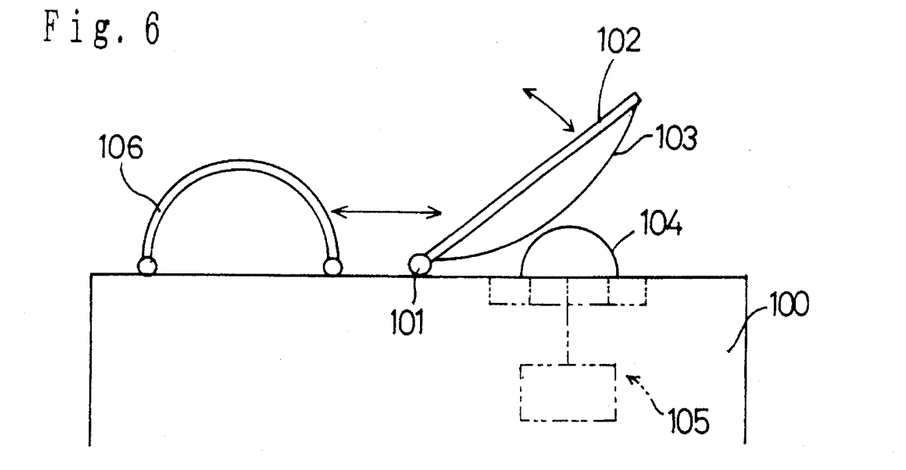
FIG. 6 is a schematic view presenting an conventional apparatus for bending laminated woods.

FIG. 6 presents a conventional apparatus for bending plywood. It comprises a bed portion 100, a sheet supporting frame 102 which is mounted to be swivelled upwards and downwards with respect to the bed portion 100 around a pivot 101, a rubber sheet 103 which is supported in a spread state by the sheet supporting frame 102, mold 104 which has a semicircular cross section and is mounted on the bed portion 100 under the rubber sheet 103, a vacuum suction device 105 which is mounted on the bed portion 105 and makes said rubber sheet 103 contact tightly with the mold 104 by a negative pressure, and a heating hood 106 sliding in the horizontal direction and subsequently covering the sheet supporting frame 102.

Figure 8:
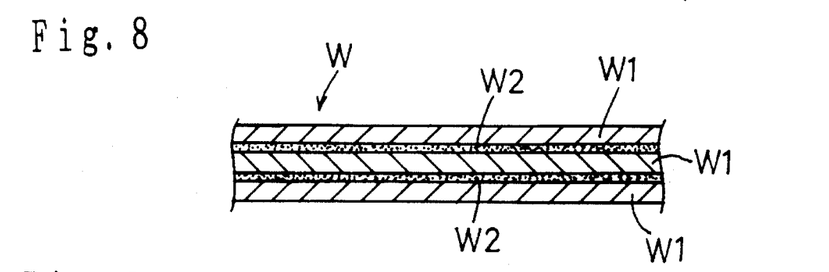
FIG. 8 is a cross-sectional view of a plywood as the work in FIG. 7.
Figure 9:
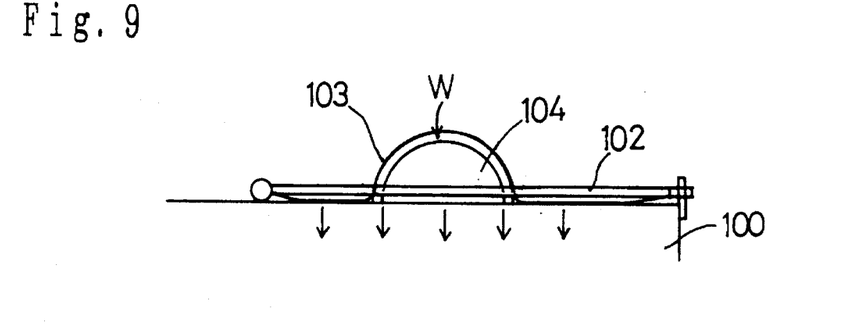
FIG. 9 is a schematic representation explaining a forming process using a conventional apparatus.
Figure 10:
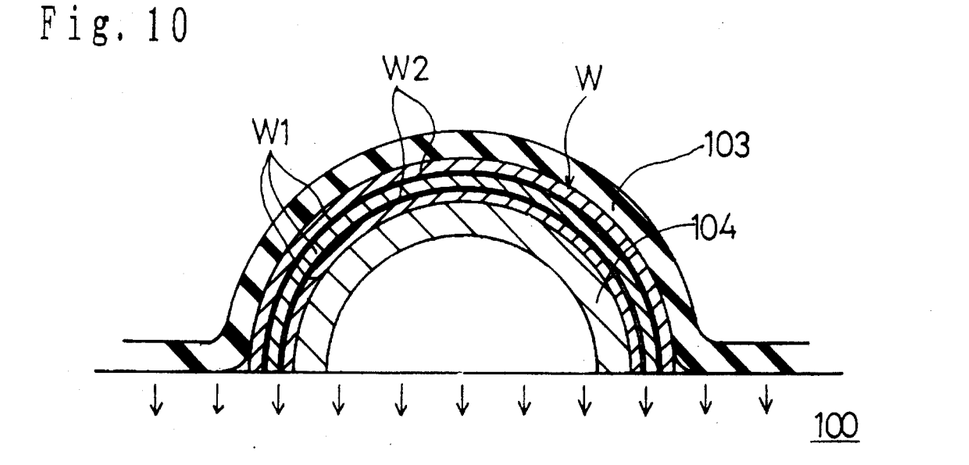
FIG. 10 is an enlarged cross-sectional view of the portion presented in FIG. 9.

The plywood (work) W to be bent is planar and consists of a plurality of elementary boards w1 laminated with uncured adhesive agent, as shown in FIG. 8. The work W is obliquely inserted between the sheet supporting frame 102 and the mold 104 while the sheet supporting frame 102 is swivelled up around the pivot 101. Then, the sheet supporting frame 102 is set down to the horizontal position and clamped to the bed portion 100. The rubber sheet 103 urges the work W into tight contact with the mold 104 when a negative pressure is applied. During this period, the elementary boards w1 are bent into semicircular shape slipping with respect to each other with the uncured adhesive agent. When the heating hood 106 presented in FIG. 6 is set and heats the work W for the defined period, the work W then maintains the bent shape due to the curing of the adhesive agent. Finally, the sheet supporting frame 102 is lifted away and the work W completed is taken out from the mold 104.

Figure 7:
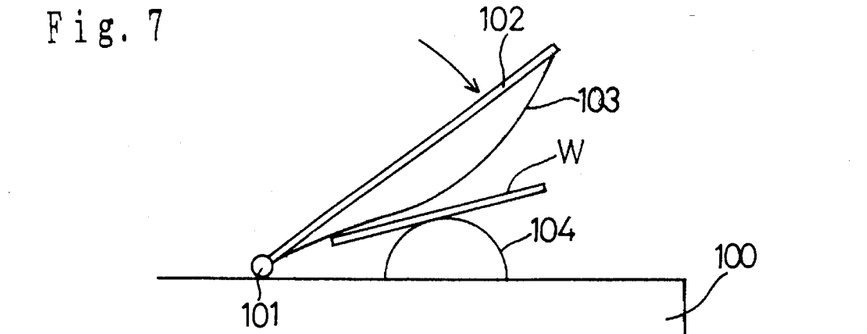
FIG. 7 is a schematic view of the conventional apparatus wherein a work is set.
Figure 12:
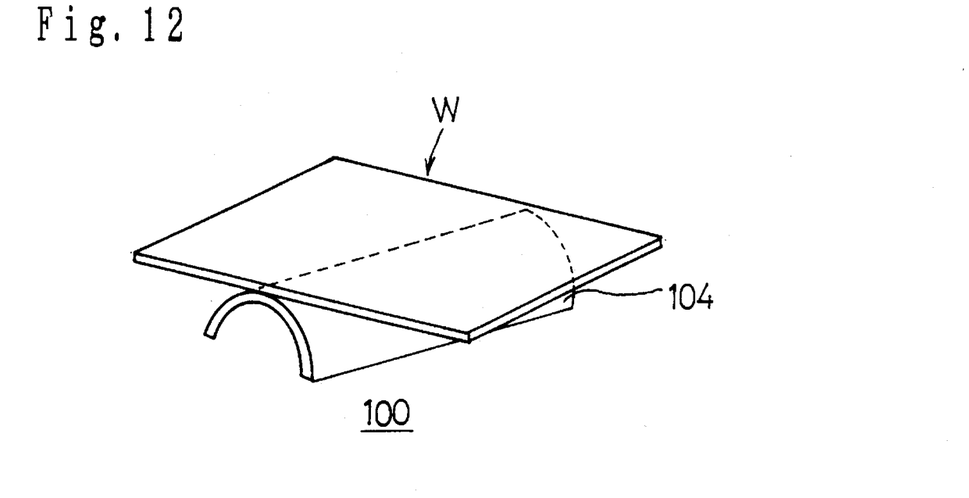
FIG. 12 is an schematic view showing another negative point of the conventional apparatus.

There are, however, several problems with such conventional forming apparatus. The first problem is that the work W is apt to be positioned at an angle with respect to the center line of the mold 104, as shown in FIG. 12, when the sheet supporting frame 102 is set down after the insertion of the work, as shown in FIG. 7. When the sheet supporting frame 102 is set down, the relaxed rubber sheet 103 contacts with the work W and dislocates it from the normal position. The work W is then formed incorrectly because it is dislocated.

The second problem is the difficulty of insertion of the work W between the rubber sheet 103 and the mold 104 because of the deflection of the relaxed rubber sheet 103, as shown in FIG. 7.

Figure 11:
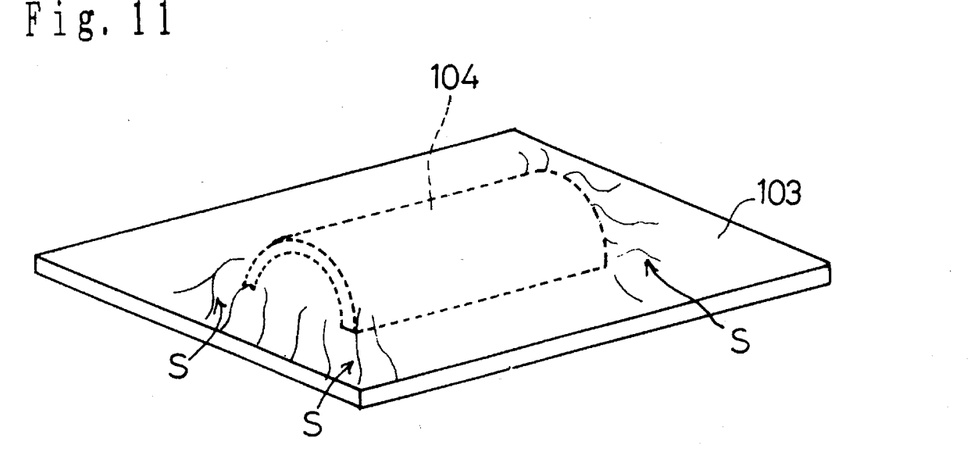
FIG. 11 is an schematic view explaining a negative point of the conventional apparatus.

The third problem is that when the rubber sheet 103 is subjected to a vacuum suction, wrinkles S appear on the edge portions of the rubber sheet 103 extending beyond both ends of the mold 104 since the length of the rubber sheet 103 is longer than that of the mold 104 to cover the mold 104, as shown in FIG. 11. The wrinkles S appear repeatedly every time of forming so that cracks generate easily from the wrinkles, thereby the life time of the rubber sheet 103 becomes short.

SUMMARY OF THE INVENTION

Therefore, the first object of this invention is to reduce the degree of the dislocation of the board (work) during forming. The second object is to make the setting of board easy. The third object is to suppress wrinkling of the flexible sheet, such as rubber sheet.

The means to solve the first object is the construction wherein a sheet supporting member, such as sheet supporting frame, is moved to and from the mold in a reciprocating motion, not pivoting motion. Therefore, this invention is characterized as; an apparatus for forming sheet materials wherein a sheet material is placed on a mold having a convex surface corresponding to the shape to be achieved by the forming, a flexible sheet covers said sheet material from the outside, and said flexible sheet is tightly contacted with the sheet material by vacuum suction thereby forming said sheet material, said apparatus comprising:

(1) a bed portion supporting said mold;

(2) a sheet supporting member for supporting said flexible sheet in a spread state;

(3) a device for transporting said sheet supporting member to and from said mold in a reciprocating motion and;

(4) a vacuum suction device mounted on said bed portion.

The solution for the second object is that sheet stretching devices are mounted on the sheet supporting member which is moved to and from the mold in a reciprocating motion by a sheet transporting device. The sheet stretching devices are mounted on said sheet supporting member, hold at least one edge portion of the flexible sheet, apply a stretching force to said flexible sheet when said sheet supporting member is in the stand-by position remote from the mold, and release the stretching force for giving the flexible sheet deflection when said sheet supporting member is in the forming position near the mold.

The invention for solving the third object is an apparatus equipped with convex portions and concave portions corresponding to the both end portions of the mold for holding the flexible sheet by clipping the end portions of it. The convex portions are mounted on said bed portion being adjacent to both the ends of said mold, wherein convexities having the same or a similar size and shape of cross section are formed nearly on the extension of the forming surface of the mold, and said convexities are facing to the end of said flexible sheet. The concave portions are mounted on said sheet supporting member, and have concavities engaged to said convexities for holding the flexible sheet by clipping the edge portions of the flexible sheet between said convexities and said concavities.

For bending a laminated sheet material consisting of a plurality of elementary sheets laminated by using a thermosetting adhesive agent, a mobile heating device is mounted in the apparatus for heating the laminated sheet material from the outside of the flexible sheet, thereby curing the adhesive agent in the laminated sheet material tightly contacted with the mold. The apparatus can be constructed as the first heat source is mounted on the heating device, the second heat source is mounted on said sheet supporting member, and all of the laminated sheet material to be bent along the mold, is heated by the combination of said first and second heat sources under the state that the sheet supporting member is located at the molding position and the mobile heating device is facing to the mold.

According to the first invention, the sheet supporting member supporting the flexible sheet in a stretched state is moved to and from the mold not in a pivoting motion but in a reciprocating motion. The sheet material is set on the mold at the stand-by position (remote from the mold) and after that the sheet supporting member is moved to the forming position (near the mold). Subsequently, the flexible sheet covers the sheet material and the mold, and then the sheet material is bent by the flexible sheet which urges the sheet material into tight contact with the mold by vacuum suction. Therefore, there is almost no possibility that the sheet material becomes out of the position, when the sheet material should be set, because of contact with the flexible sheet.

According to the second invention, while the sheet material is in the setting on the mold, the flexible sheet at the stand-by position remote from the mold is stretched by the sheet stretching devices.

In the third invention, convexities and concavities which are positioned adjacent to both end portions of the mold for holding the end portions of the flexible sheet during vacuum suction. Therefore, the flexible sheet increases its life time since wrinkles are hardly generated during the vacuum suction.

If heating is required, by using the apparatus wherein the first heat source is mounted on the heating device and the second heat source is mounted on said sheet transporting member, all of the laminated sheet material in a bent state can be heated uniformly along the direction of bending. In case that the mobile heating device moves in a direction crossing over the sheet supporting member, a structure which allows heating the entire mold is not achieved since interferences with the mold needed to be avoided. This invention, however, enables uniform heating of the entire mold by a complementary heating with the second heating source mounted on the sheet transporting member.

DETAILED DESCRIPTION OF THE PREFERABLE EMBODIMENTS

An embodiment of this invention will now be described with reference to drawings.

Figure 1:
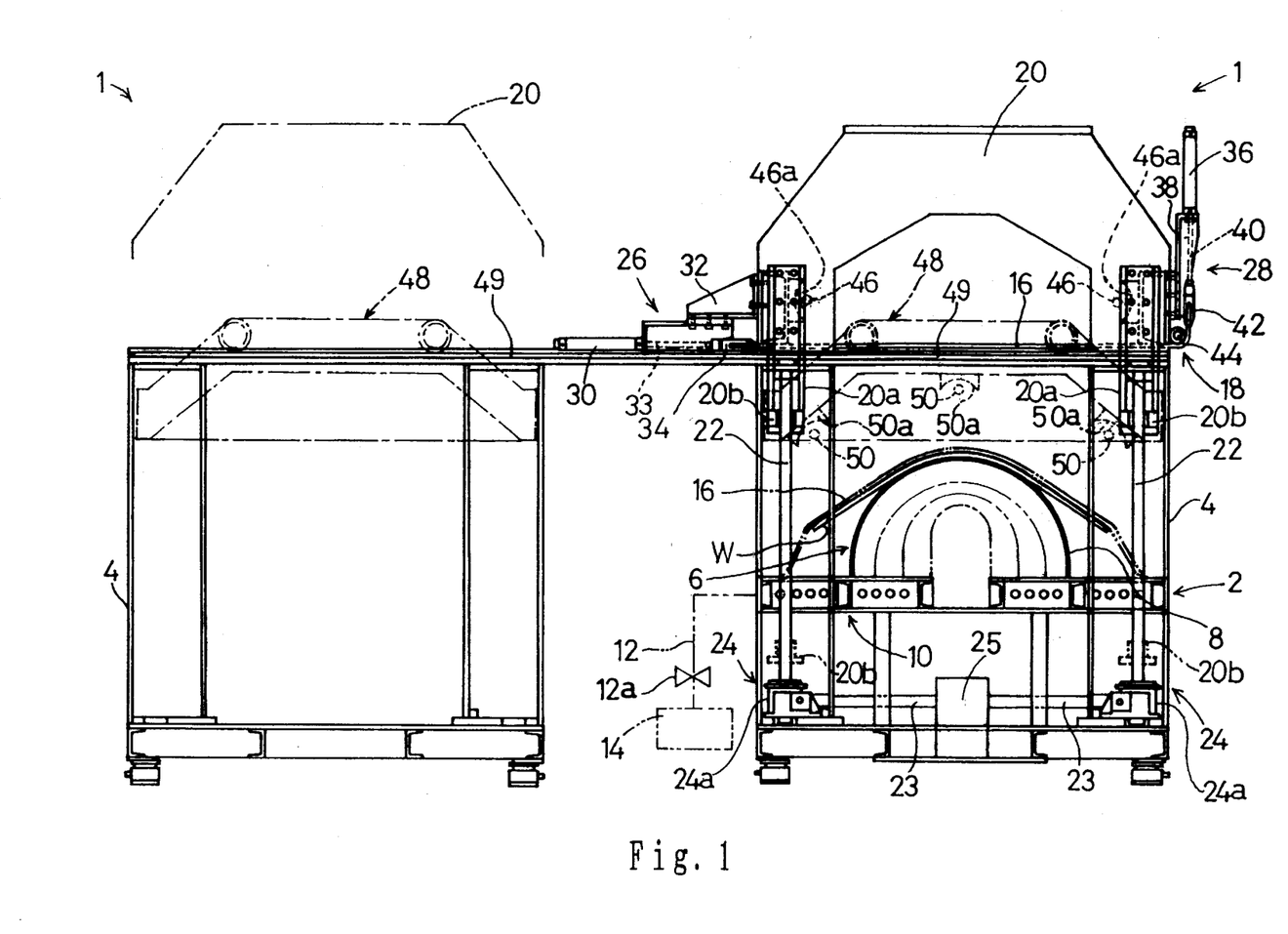
FIG. 1 is a front view showing a preferable embodiment of an apparatus for bending laminated woods according to this invention.

In the apparatus for bending sheet materials, whose front view is presented in FIG. 1, two same forming units 1 are juxtaposed. Each forming unit 1 has the same structure so that the description will be performed only for one forming unit (right side) 1. Furthermore, for the left forming unit 1, only the outline is presented while the mechanical details is omitted in the figure. The forming unit 1 has the bed portion 2 in its lower part. The bed portion 2 is supported by a frame of apparatus 4 and is equipped with a mold 6. The mold 6 has an almost semicircular cross section and is mainly made of a thick plywood which is supported by a transverse framework which is not presented in the figure. The mold 6 is replaced according to the radius needed for forming the work. Three imaginary lines inside present the shapes of the molds with various sizes.

A vacuum suction device 10, which is mounted on the bed portion 2, has many suction cavities which are not presented in the figure, suction channels 12 leading to the suction cavities, a valve 12a and a suction pump 14 connected with the suction channels 12. A rubber sheet 16, as a flexible sheet, is sucked to be tightly contacted with the forming surface 8 by operating the suction pump 14 and switching the valve 12a.

The rubber sheet 16 is, for example, rectangular one with a thickness of about 10 mm, whose two opposite longitudinal edges are supported by the sheet supporting device 18. The sheet supporting device 18 has an planer type frame 20, which is supported to be movable upwards and downwards, whereby the rubber sheet 16 can move to and from the mold 6 in a reciprocating motion.

Jack devices 24 are mounted on four comers in the elevation of the frame of apparatus 20. These jack devices 24 comprise four threaded shafts 22 mounted rotatably around perpendicular axes and a common driving motor 25, which rotates these threaded shafts 22 simultaneously through transmission shafts 23. The lower end of each threaded shaft 22 is connected with the portion 24a for transmitting the rotation. Four brackets 20a extending downwards are secured to the frame 20, which is supported being screwed on four said threaded shafts 22 through nuts 20b mounted on the lower end of each bracket 20a. When each threaded shafts are rotated simultaneously in forward or reverse direction by said driving motor 25, the frame 20 moves up or down through the nuts 20b screwed on each threaded shaft 22.

Figure 2:
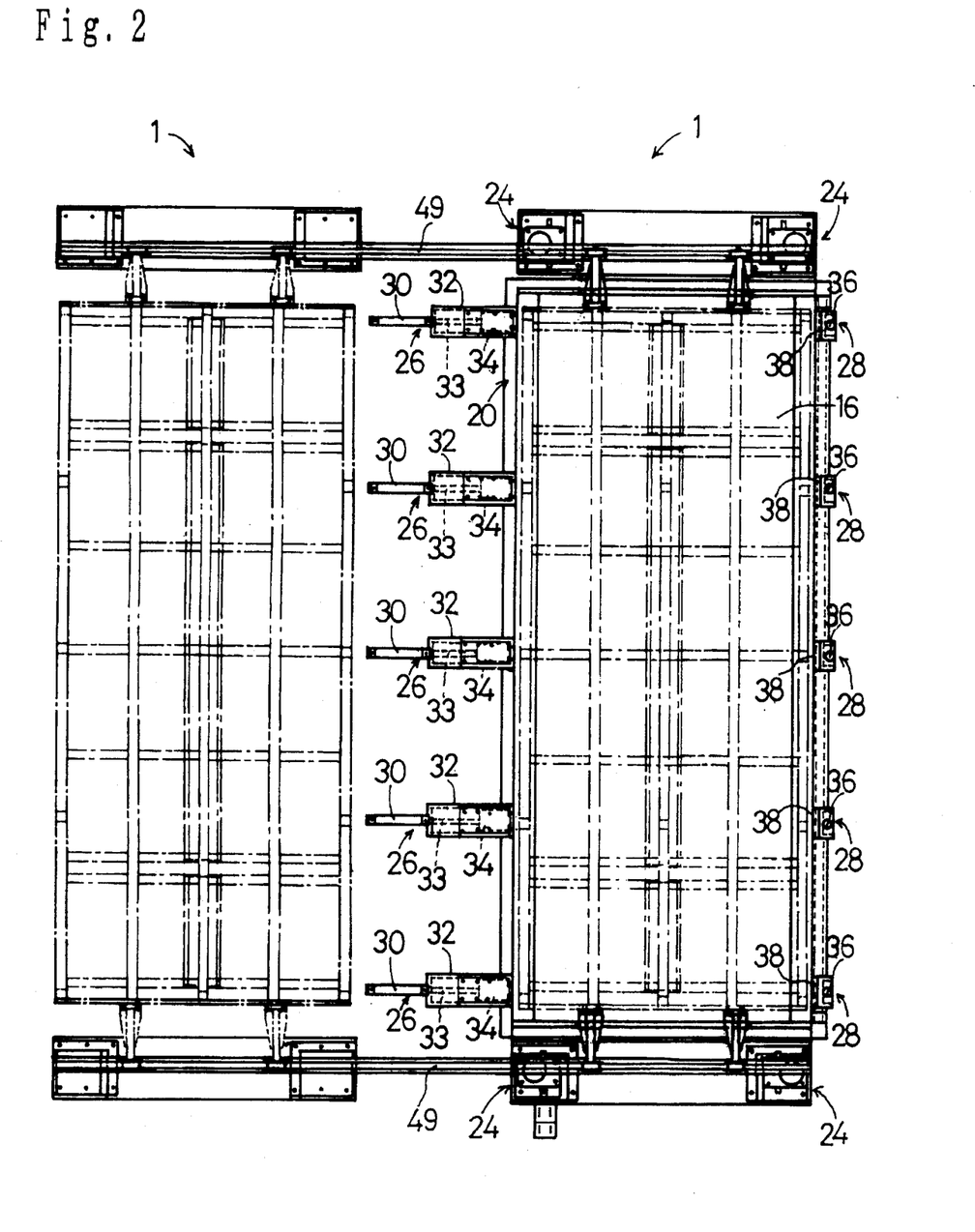
FIG. 2 is an elevation of the apparatus shown in FIG. 1.

The rubber sheet 16 is supported by the frame 20 through the sheet stretching devices 26 and 28. The sheet stretching devices 26 and 28 (5 for each) are mounted along the two opposite longitudinal edges of the rubber sheet with the same intervals, respectively, as shown in FIG. 2. As shown in FIG. 1, in the sheet stretching devices 26 for one side, air cylinders 30 are fixed to the frame 20 through brackets 32, and clamps 34 mounted on the tip of each piston rod 33 are holding the edge portions of the rubber sheet 16. In the sheet stretching devices 28 positioned counter to the sheet stretching devices 26, cylinders 36 are secured to the frame 20 with brackets 38, and clamps 42 are mounted on the tip of each piston rod 40. The edge portions of the rubber sheet 16 are aligned perpendicularly upwards by a roller 44 and said clamps 42 clamp the edge portions. When the cylinders 30, 36 of the sheet stretching devices 26, 28 are in the extended position, the rubber sheet 16 is relaxed. Contrary to this, when the cylinders 30,36 are in the retracted position, the rubber sheet 16 is stretched and the deflection of the rubber sheet 16 is absorbed. These cylinders 30,36 are connected with a compressed air supplying unit which is not drawn in the figure.

Figure 3:
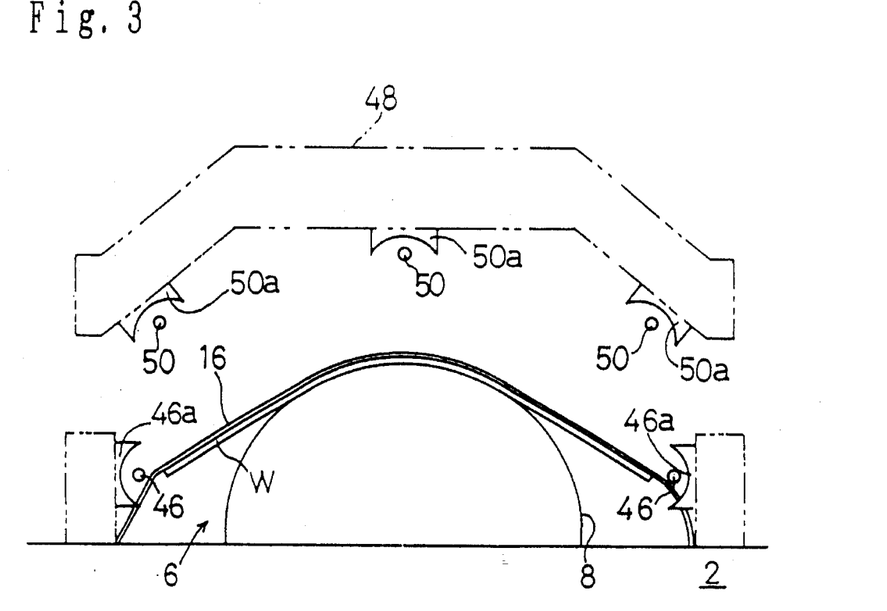
FIG. 3 is a partial view showing the position of the heating device.

Rod-like ceramic heaters 46 used for far infra-red radiation, and as the second heat source, are horizontally arranged on both insides of the frame so that the heaters 46 face each other at equal distances along the longitudinal direction of the rubber sheet 16. A reflector 46a with a cylindrical concavity is equipped behind each rod-like ceramic heater 46. A heating hood 48, used as a mobile heating device, is mounted over the mold 6. The heating hood 48 is supported movably in the horizontal direction along guide rails 49, which connects the juxtaposed forming units 1, thereby the hood 48 functions as a heating device commonly used for two of the forming units 1. Ceramic heaters 50, used as the first heat source, are arranged on three positions on the inside of the heating hood 48, i.e., both sides and the center so that the heaters 50 are facing to the forming surface 8 of the mold 6 at a defined distance. Reflectors 50a with cylindrical concavities are behind the ceramic heaters 50 in the same construction for the ceramic heaters 46 and the reflector 46a. The ceramic heaters 50 on these three positions are arranged at equal distances along the longitudinal direction of the mold 6. As is shown in FIG. 3, when the frame 20 is in the position of the lower end of its motion at the side of mold 6 (forming position), ceramic heaters 46 and 50 are facing to the semicircular forming surface 8 of the mold 6 with a almost uniform gap along the circumferential direction. Therefore, the adhesive agent of the work W is uniformly heated through the rubber sheet 16, which is tightly contacted with the mold 6, and cured.

Figure 4:
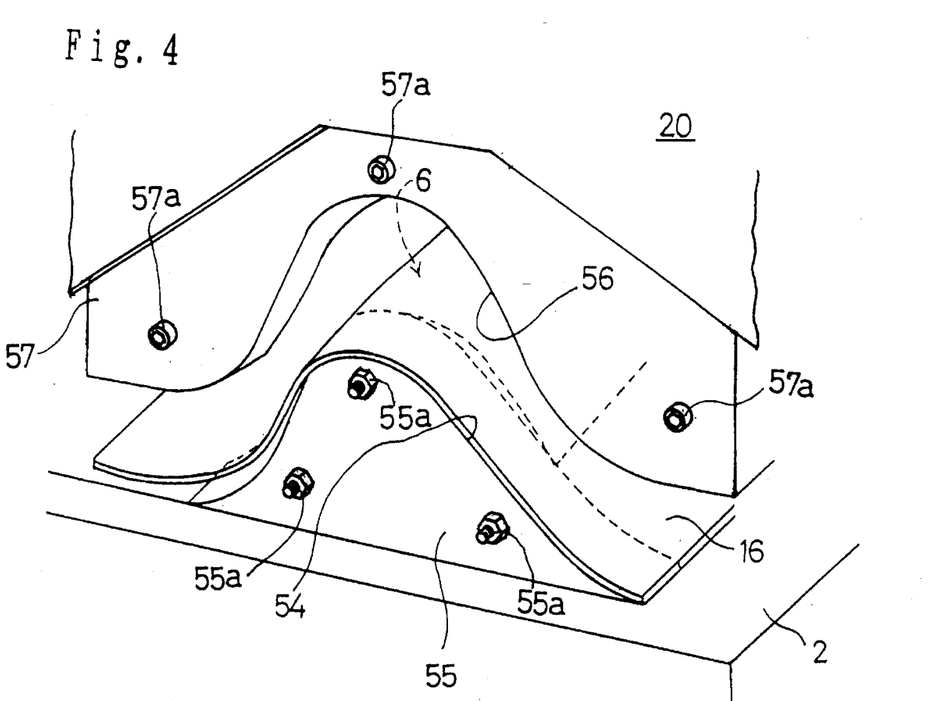
FIG. 4 is a perspective view showing an embodiment of a convex portion and a concave portion for holding the sheet end portion.

As shown in FIG. 4, while the rubber sheet 16 is extending beyond both ends of the mold in the longitudinal direction, convex portions 54 for holding the edge portions of the rubber sheet are formed on the bed portion 2 being adjacent to both end portions of the mold 6. Each convex portion has a smooth sinusoidal convex surface, and the shape and size of cross section of the convex portion is similar to those of the mold 6.

On the other hand, concave portions 56 are formed on said frame 20 facing to the convex portions. The size and shape of the concave portions 56 are just fitting to those of the convex portions 54. At the position where the frame 20 reaches to the lower end of its motion, the convex portions 54 and the concave portions 56 are engaged each other, and keep the tightness between the bed portion 2 and the rubber sheet 16 clipping the rubber sheet between themselves. Accordingly, the appearance of wrinkles on both longitudinal edge portions of the rubber sheet is avoided or suppressed.

The convex members 55, on which the convex portions 54 are formed, are secured with a plurality of bolts and nuts 55a on the end surfaces of the mold 6, and are mounted removably through the mold 6 on the bed portion 2. On the other hand, the concave members 57 on which the concave portions 56 are formed are mounted removably on the lower part of the frame 20 with a plurality of bolts and nuts 57a. When the mold 6 is replaced with that having a different radius or a different shape of cross section, the convex and concave members 55 and 57 are also replaced with those having corresponding size and cross section. In this case, the plurality of bolts and nuts 55a and 57a are once removed, said convex members 55 and concave members 57 are replaced with new ones, and then said plurality of bolts and nuts 55a and 57a are secured again.

In the following part, the operation of the apparatus for bending laminated sheet materials, which is constructed as mentioned above, will be explained.

First of all, the sheet material to be bent, i.e., the work W is set on the mold while the Frame 20 is located at the upper end of its motion (stand-by position) as shown in FIG. 1.

FIG. 8 presents the work W wherein a plurality of elementary boards W1 are laminated with adhesive agent W2 so that the thickness of the work W reaches to a designated value.

Figure 5:
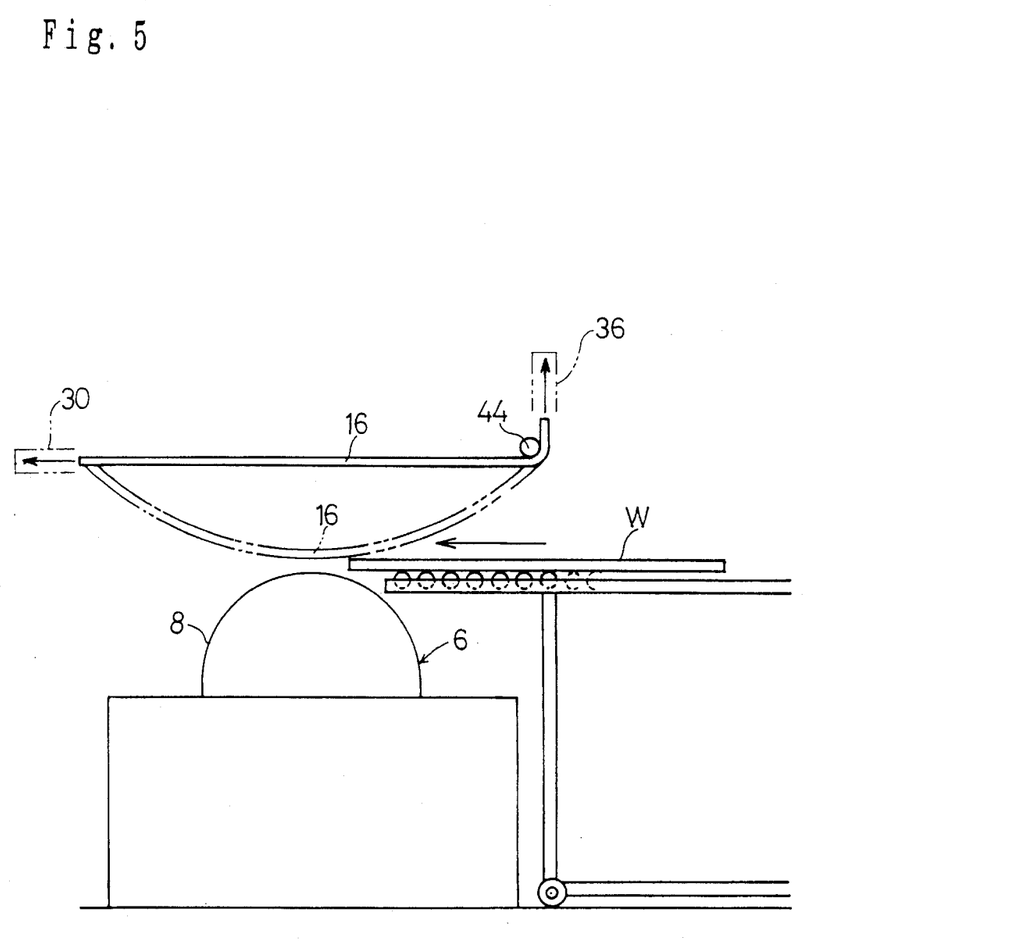
FIG. 5 is a schematic view showing the state in which work (plywood) is set on the mold.

As shown in FIG. 5, the rubber sheet 16 interferes with the insertion of the work W if the rubber sheet is exhibiting deflection. In this embodiment however, the work W is inserted easily since the rubber sheet 16 is stretched from both sides by the cylinders 30 and 36 for avoiding the deflection.

After the setting of the work W, the frame 20 is traversed downwards by the jack devices 24, and the cylinders 30, 36 of the sheet stretching device 26, 28 are extended for relaxing the rubber sheet. Under this state, the rubber sheet 16 covers the work W on the mold 6 from the upper side. At this time, two longitudinal edge portions of the rubber sheet 16 are clipped between the convex portions 54 and concave portions 56 presented in FIG. 4, and the tightness between the rubber sheet 16 and bed portion 2 is ensured. When the vacuum suction device 10, shown in FIG. 1, is operated while this state is being maintained, the rubber sheet 16 is attracted to the mold 6 and bends the work W along the forming surface 8, and the work W is finally maintained tightly contacting with the forming surface 8 by the rubber sheet 16.

Subsequently, the ceramic heaters 50 generate heat while the heating hood 48 is placed over the mold 6, and the ceramic heaters 46 (FIG. 3) on the frame 20 also generate heat so that the work W, which is tightly contacted with the mold 6, is heated through the rubber sheet 16 from the outside. Consequently, the adhesive agent W2 developed between the elementary boards W1 in the work W is cured by the heating. In other words, the heating is continued until the curing is completed.

When the heating is completed, the heating hood 48 slides to the side of the other forming unit 1. The rubber sheet 16 is released from the vacuum suction, and the frame 20 of FIG. 1 is traversed upwards. At this time, the sheet stretching devices 26, 28 stretch the rubber sheet 16 and move up to the upper end of the motion maintaining the state that the deflection of the rubber sheet 16 is absorbed. The work W bent is taken out from the mold 6, and then the next work is set.

During the setting of the work W, the heating hood 48 is transferred along the guide rails 49 to the other juxtaposed forming unit 1 having the same construction (the work W has already been set in the forming unit 1 to which the heating hood 48 is to be transferred), and the heating process is carried out thereat. Conversely, the setup process, such as setting of the work W, is carried out during the heating for the other forming unit 1.

As it is clear from the description above, in this embodiment the rubber sheet 16 is moved up and down, and the deflection of the rubber sheet 16 is absorbed during the setting of the work W so that it is easy to set the work W on the mold 6, and such problem that the work W once set is dislocated by the rubber sheet 16 hardly occurs. Furthermore, wrinkling of the both edge portions of the rubber sheet 16 is reduced because of the existence of the convex portions 54 and the concave portions 56 for holding the end portions of the rubber sheet.

Although the embodiment mentioned above is constructed so that two forming units 1 are installed and one heating unit is commonly used by said forming units 1, a simple construction comprising one forming unit 1 and one heating hood 48 is possible. A construction comprising no heating devices is also possible for the case that the sheet materials is formed without heating (for example, wherein adhesive agent which hardens at around room temperature within a defined time is developed between elementary boards, and the boards laminated are bent before the adhesive agent hardens). Furthermore, this invention is applicable for bending various sheet materials besides laminated woods.

That which is claimed is:

1. In an apparatus for forming sheet materials wherein a sheet material is placed on a mold having a convex surface corresponding to the shape to be achieved by forming, wherein a flexible sheet covers said sheet material, and wherein said flexible sheet is tightly contacted with the sheet material by vacuum suction thereby forming said sheet material, said apparatus comprising:

a bed portion supporting said mold;

a sheet supporting member for supporting said flexible sheet in a spread state;

a sheet transporting device for transporting said sheet supporting member to and from said mold in a reciprocating motion;

a sheet stretching device mounted on said sheet supporting member, wherein said sheet stretching device applies a stretching force to said flexible sheet when said sheet supporting member is in a stand-by position remote from the mold and releases the stretching force for giving the flexible sheet deflection when said sheet supporting member is in a forming position near the mold; and a vacuum suction device mounted on said bed portion.

2. An apparatus for forming laminated sheet materials comprising:

a mold having two end portions and having a convex forming surface corresponding to a shape to be achieved by forming, on which said laminated sheet materials is placed;

a flexible sheet which covers said sheet material on said mold which tightly compresses said laminated sheet materials by use of vacuum suction, and which forms said sheet material;

a bed portion supporting said mold;

a sheet supporting member for supporting said flexible sheet in a spread state;

a sheet transporting device for transporting said sheet supporting member to and from said mold in a reciprocating motion;

convex portions mounted on said bed portion and mounted adjacent to both end portions of said mold, wherein convexities having the same size and shape of cross section as said convex portions are formed on an extension of the forming surface of the mold, and said convexities are facing to edge portions of said flexible sheet;

concave portions which are mounted on said sheet supporting member, and have concavities engaged to said convexities for holding the flexible sheet by clipping end portions of the flexible sheet between said convexities and said concavities; and a vacuum suction device mounted on said bed portion.

3. In an apparatus for forming sheet materials wherein a sheet material is placed on a mold having two end portions and having a convex forming surface corresponding to the shape to be achieved by forming, wherein a flexible sheet covers said sheet material, and wherein said flexible sheet is tightly contacted with the sheet material by vacuum suction thereby forming said sheet material, said apparatus comprising:

a bed portion supporting said mold;

a sheet supporting member for supporting said flexible sheet in a spread state;

a sheet transporting device for transporting said sheet supporting member to and from said mold in a reciprocating motion;

a sheet stretching device mounted on said sheet supporting member, said sheet stretching device applies a stretching force to said flexible sheet when said sheet supporting member is in a forming position near the mold and;

convex portions mounted on said bed portion and mounted adjacent to both the ends of said mold, wherein convexities having the same size and shape of cross section as said convex portions are formed on an extension of the forming surface of the mold, and said convexities are facing to end portions of said flexible sheet;

concave portions which are mounted on said sheet supporting member, and have concavities engaged to said convexities for holding the flexible sheet by clipping end portions of the flexible sheet between said convexities and said concavities; and a vacuum suction device mounted on said bed portion.

4. An apparatus for forming laminated sheet materials having a plurality of elementary sheets by using a thermosetting adhesive agent placed on said sheets, which thermosetting adhesive agent is hardened by external heating applied to the laminated sheet materials comprising:

a mold having a convex surface corresponding to a shape to be achieved by forming and on which said laminated sheet materials are placed;

a flexible sheet which covers said laminated sheet materials on said mold, which tightly compresses said laminated sheet materials by use of vacuum suction, which forms said laminated sheet material, and which allows heat to pass through it to provide said external heating;

a bed portion supporting said mold;

a sheet supporting member for supporting said flexible sheet in a spread state;

a sheet transporting device for transporting said sheet supporting member to and from said mold in a reciprocating motion;

a mobile heating device mounted so that it moves crossing the direction in which said sheet transporting device transports said sheet supporting member in a reciprocating motion, and said mobile heating device moves between positions facing to said mold and remote from the mold by a driving unit;

a primary heat source mounted on said mobile heating device for heating the laminated sheet material, which is tightly contacted with a forming surface of said mold by said flexible sheet, from a direction opposed to the mold through said flexible sheet; and a secondary heat source mounted on said sheet supporting member for heating the laminated sheet material, which is tightly contacted with the forming surface of said mold by said flexible sheet, from both sides of a top surface of said mold convex surface of said laminated sheet material which is to be bent along said convex surface of said mold through said flexible sheet.

5. The apparatus according to claim 2;

wherein a frame of said sheet supporting member is supported by a jack device so that said sheet transporting device can be traversed up and down in a vertical direction, wherein said jack device is equipped with a plurality of threaded shafts rotatable around vertical axes and a motor for rotating said threaded shafts, wherein said frame is screwed on said threaded shafts with nuts, and wherein said frame is traversed up and down by the forward or reverse rotation of said threaded shafts driven by said motor.

6. An apparatus for forming sheet materials comprising:

a mold having a convex surface corresponding to a shape to be achieved by forming and on which said laminated sheet materials are placed;

a flexible sheet which covers said laminated sheet material on said mold, which tightly compresses said laminated sheet material by use of vacuum suction and which forms said laminated sheet material;

a bed portion supporting said mold;

a sheet supporting member for supporting said flexible sheet in a spread state;

a sheet transporting device for transporting said sheet supporting member to and from said mold in a reciprocating motion;

a sheet stretching device mounted on said sheet supporting member, wherein said sheet stretching device applies a stretching force to said flexible sheet when said sheet supporting member is in a stand-by position remote from the mold and releases the stretching force for giving the flexible sheet deflection when said sheet supporting member is in a forming position near the mold; and a vacuum suction device mounted on said bed portion;

wherein a frame of the sheet supporting member is supported over said bed portion so that said sheet supporting member is movable to and from said mold, wherein said sheet transporting device raises said frame to said stand-by position and lowers the frame to the forming position, wherein said sheet stretching device comprises a plurality of linear actuated cylinders which hold at least one edge portion of said flexible sheet, wherein said stretching cylinders maintain the flexible sheet in a stretched state at a position where said frame reaches to an upper end of its motion and in a relaxed state at a position where said frame reaches to a lower limit of its motion.

7. The apparatus according to claim 2;

wherein a frame of the sheet supporting member is supported over said bed portion so that said sheet supporting member can be traversed up and down in a perpendicular direction, wherein said sheet transporting device lifts up said frame to a stand-by position and lowers the frame to a forming position, wherein said convex portions and said concave portions are mounted on said bed portion and on said frame, respectively; and wherein when said mold is replaced with a mold of different size or shape, said convex portion and said concave portion are also replaced with those corresponding to the mold.

8. The apparatus according to claim 4 further comprising a sheet stretching device mounted on said sheet supporting member, wherein said sheet stretching device applies a stretching force to said flexible sheet when said sheet supporting member is in a stand-by position remote from the mold, and releases a stretching force for giving the flexible sheet deflection when said sheet supporting member is in a forming position near the mold.

9. The apparatus according to claim 4 further comprising:

convex portions mounted on said bed portion and mounted adjacent to both edge portions of said mold, wherein convexities having the same size and shape of cross section as said convex portions are formed nearly on an extension of the forming surface of the mold, and said convexities are facing to edge portions of said flexible sheet; and concave portions which are mounted on said sheet supporting member, and have concavities engaged to said convexities for holding the flexible sheet by clipping end portions of the flexible sheet between said convexities and said concavities.

10. An apparatus for forming sheet materials comprising:

a mold on which said laminated sheet materials is placed having two end portions and having a convex surface corresponding to a shape to be achieved by forming;

a flexible sheet which covers said laminated sheet material on said mold, which tightly compresses said laminated sheet materials by use of vacuum suction and which forms said laminated sheet materials;

a bed portion supporting said mold;

a sheet supporting member for supporting said flexible sheet in a spread state;

a sheet transporting device for transporting said sheet supporting member to and from said mold in a reciprocating motion;

a sheet stretching device mounted on said sheet supporting member, wherein said stretching device stretches said flexible sheet by moving one edge of said flexible sheet relative to the other edge thereof and thereby decreasing deflection of said flexible sheet due to the weight thereof when said sheet supporting member is in a stand-by position remote from the mold, and said stretching device releases stretching of the flexible sheet when said sheet supporting member is in a forming position near the mold; and a vacuum suction device mounted on said bed portion.

11. In an apparatus for forming sheet materials wherein a sheet material is placed on a mold having a convex surface corresponding to the shape to be achieved by forming, wherein a flexible sheet covers said sheet material, and wherein said flexible sheet is tightly contacted with the sheet material by vacuum suction thereby forming said sheet material, said apparatus comprising;

a bed portion supporting said mold;

a sheet supporting member for supporting said flexible sheet in a spread state;

a sheet transporting device for transporting said sheet supporting member to and from said mold in a reciprocating motion;

a sheet stretching device mounted on said sheet supporting member, wherein said sheet stretching device supports at least one edge portion of said flexible sheet and moves along the direction of stretching said flexible sheet thereby decreasing a deflection of said flexible sheet when said sheet supporting member is in a stand-by position and said stretching device releases stretching of the flexible sheet when said sheet supporting member is in a forming position; and a vacuum suction device mounted on said bed portion.

12. In an apparatus for forming sheet materials wherein a sheet material is placed on a mold having a convex surface corresponding to the shape to be achieved by forming, wherein a flexible sheet covers said sheet material, and wherein said flexible sheet is tightly contacted with the sheet material by vacuum suction thereby forming said sheet material, said apparatus comprising;

a bed portion supporting said mold;

a sheet supporting member for supporting said flexible sheet in a spread state;

a sheet transporting device for transporting said sheet supporting member to and from said mold in a vertical reciprocating motion;

a sheet stretching device comprising a plurality of stretching cylinders which hold at least one edge portion of said flexible sheet and move said one edge portion away from the other edge portion thereby stretching said flexible sheet and decreasing deflection thereof, and wherein said stretching cylinders maintain the flexible sheet in a stretched state at a position where said sheet supporting member reaches to an upper end of its motion, and in a relaxed state at a position where said sheet supporting member reaches to a lower limit of its motion; and a vacuum suction device mounted on said bed portion.

13. An apparatus for forming laminated sheet materials having a plurality of elementary sheets laminated by using a thermosetting adhesive agent placed on said sheets which thermosetting adhesive agent is hardened by external heating of the laminated sheet materials comprising;

a mold having a convex surface corresponding to a shape to be achieved by forming, on which said laminated sheet materials are placed, a flexible sheet which covers said laminated sheet materials on said mold, which tightly compresses said laminated sheet materials by use of vacuum suction, which forms said laminated sheet material, and which allows heat to pass through it to provide said external heating;

a bed portion supporting said mold;

a sheet supporting member for supporting said flexible sheet in a spread state;

a sheet transporting device for transporting said sheet supporting member to and from said mold in a reciprocating motion;

a mobile heating device mounted so that it moves crossing the direction in which said sheet transporting device transports said sheet supporting member;

a primary heat source mounted on said mobile heating device for heating the laminated sheet material, which is tightly contacted with a forming surface of said mold by said flexible sheet, from a direction opposed to the mold through said flexible sheet; and a secondary heat source mounted on said sheet supporting member for heating the laminated sheet material, which is tightly contacted with the forming surface of said mold by said flexible sheet, from both sides of a top surface of said mold convex surface of said laminated sheet material which is to be bent along said convex surface of said mold through said flexible sheet.

14. The apparatus according to claim 3;

wherein a frame of said sheet supporting member is supported by a jack device so that said sheet transporting device can be traversed up and down in a vertical direction, wherein said jack device is equipped with a plurality of threaded shafts rotatable around vertical axes and a motor for rotating said threaded shafts, wherein said frame is screwed on said threaded shafts with nuts, and wherein said frame is traversed up and down by the forward or reverse rotation of said threaded shafts driven by said motor.

* * * * *